(12) United States Patent
Rivera

(10) Patent No.: US 11,840,397 B2
(45) Date of Patent: *Dec. 12, 2023

(54) METHOD OF CONSTRUCTING A BEVERAGE BREWING CARTRIDGE

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,235

(22) Filed: Jun. 1, 2022

(65) Prior Publication Data
US 2022/0402689 A1  Dec. 22, 2022

Related U.S. Application Data

(60) Division of application No. 17/163,121, filed on Jan. 29, 2021, now abandoned, and a continuation-in-part of application No. 15/256,929, filed on Sep. 6, 2016, now Pat. No. 10,912,407, which is a continuation-in-part of application No. 15/187,444, filed on Jun. 20, 2016, now Pat. No. 9,586,709.

(51) Int. Cl.
*B65B 29/02* (2006.01)
*B65B 1/24* (2006.01)
*B65B 67/02* (2006.01)
*B65D 85/804* (2006.01)

(52) U.S. Cl.
CPC ............ *B65D 85/8052* (2020.05); *B65B 1/24* (2013.01); *B65B 29/022* (2017.08); *B65B 67/02* (2013.01)

(58) Field of Classification Search
CPC ......... B65B 1/24; B65B 29/02; B65B 29/022; B65B 67/02; B65D 85/8043; B65D 85/8052; A47J 31/0673; A47J 31/0689; A47J 31/407; B30B 1/04; B30B 15/065
USPC ..... 53/436, 471, 527, 281, 284, 390; 426/77
See application file for complete search history.

(56) References Cited

U.S. PATENT DOCUMENTS

| | | |
|---|---|---|
| 643,443 A | 2/1900 | Aiken |
| 818,812 A | 4/1906 | Bartholomew |
| 2,046,367 A | 7/1936 | Collins |
| 2,181,945 A | 12/1939 | Komarik |
| 2,524,243 A | 10/1950 | Wicklund |

(Continued)

FOREIGN PATENT DOCUMENTS

| | | |
|---|---|---|
| DE | 2003483 A | 8/1971 |
| DE | 3514512 C1 | 6/1986 |

(Continued)

*Primary Examiner* — Stephen F. Gerrity
(74) *Attorney, Agent, or Firm* — IP Strategies

(57) ABSTRACT

A beverage brewing cartridge includes a base including a sidewall having first and second open ends and a cover sealed to a rim of the first open end, and a plug configured to be inserted into the second open end. The cartridge is configured to hold beverage brewing material when the plug is inserted. The cover is configured to be breached to allow pressurized liquid to enter the cartridge to brew a beverage. The plug includes weakened areas configured to open after the pressurized liquid enters the cartridge to allow the beverage to flow from the cartridge. A method of constructing the cartridge includes placing the base in a holder, inserting a portion of brewing material into the base through the second open sidewall end, tamping the brewing material in the base through the second open sidewall end, and inserting the plug into the second open sidewall end.

22 Claims, 16 Drawing Sheets

(56) References Cited

U.S. PATENT DOCUMENTS

| | | | |
|---|---|---|---|
| 2,626,738 A | | 1/1953 | Nordquist |
| 2,693,752 A | | 11/1954 | Garapolo |
| 2,936,695 A | * | 5/1960 | Donot ................ B65B 85/8043 99/295 |
| 3,748,819 A | | 7/1973 | Christensson |
| 3,811,373 A | | 5/1974 | Telco |
| 4,136,202 A | * | 1/1979 | Favre ................ B65D 85/8049 426/77 |
| 4,338,765 A | | 7/1982 | Ohmori et al. |
| 4,957,753 A | | 9/1990 | Bardsley et al. |
| 5,402,707 A | * | 4/1995 | Fond et al. ........ B65D 85/8043 99/302 R |
| 5,526,733 A | | 6/1996 | Klawuhn et al. |
| 5,637,335 A | | 6/1997 | Fond et al. |
| 5,656,311 A | * | 8/1997 | Fond .................... B65B 29/022 426/77 |
| 5,941,055 A | | 8/1999 | Coates |
| 6,260,475 B1 | | 7/2001 | Tegel et al. |
| 6,481,338 B1 | | 11/2002 | Wai |
| 8,479,638 B2 | | 7/2013 | Leung et al. |
| 9,527,662 B2 | * | 12/2016 | Goglio et al. ..... B65D 85/8061 |
| 9,586,709 B1 | | 3/2017 | Rivera |
| 10,912,407 B2 | * | 2/2021 | Rivera et al. ......... B65B 29/022 |
| 11,014,737 B2 | * | 5/2021 | Rondelli ............ B65D 85/8061 |
| 11,021,284 B2 | * | 6/2021 | Rivera ................. B65B 29/022 |
| 2007/0144357 A1 | | 6/2007 | Rivera |
| 2011/0162533 A1 | | 7/2011 | Fumagalli |
| 2013/0139699 A1 | | 6/2013 | Rivera |
| 2013/0167729 A1 | | 7/2013 | Hoare et al. |
| 2013/0186046 A1 | | 7/2013 | Magniet et al. |
| 2014/0004231 A1 | | 1/2014 | Norton |
| 2014/0290493 A1 | | 10/2014 | Rivera |
| 2015/0201792 A1 | * | 7/2015 | Doglioni Majer . B65D 85/8046 220/660 |
| 2016/0157661 A1 | | 6/2016 | Torquemada |
| 2016/0257548 A1 | | 9/2016 | Rivera |
| 2017/0334623 A1 | * | 11/2017 | Gualandi et al. ..... B65B 29/022 |

FOREIGN PATENT DOCUMENTS

| | | | |
|---|---|---|---|
| DE | 102006010772 A1 | | 9/2007 |
| DE | 102010048513 A1 | | 4/2012 |
| DE | 102013005597 A1 | | 10/2014 |
| EP | 0524464 A1 | | 1/1993 |
| EP | 1576912 A2 | | 9/2005 |
| EP | 1997748 A1 | | 12/2008 |
| FR | 620589 A | | 4/1927 |
| FR | 2620680 A1 | | 3/1989 |
| FR | 2895660 A1 | | 7/2007 |
| FR | 2900810 A1 | | 11/2007 |
| FR | 3022533 A1 | | 12/2015 |
| WO | 2007080258 A2 | | 7/2007 |
| WO | 2012080814 A1 | | 6/2012 |
| WO | 2014/041419 A1 | | 3/2014 |
| WO | 2014041419 A1 | | 3/2014 |
| WO | 2015118446 A1 | | 8/2015 |
| WO | 2016001883 A1 | | 1/2016 |
| WO | WO-2016111626 A1 * | 7/2016 | ............. B65B 29/02 |

\* cited by examiner

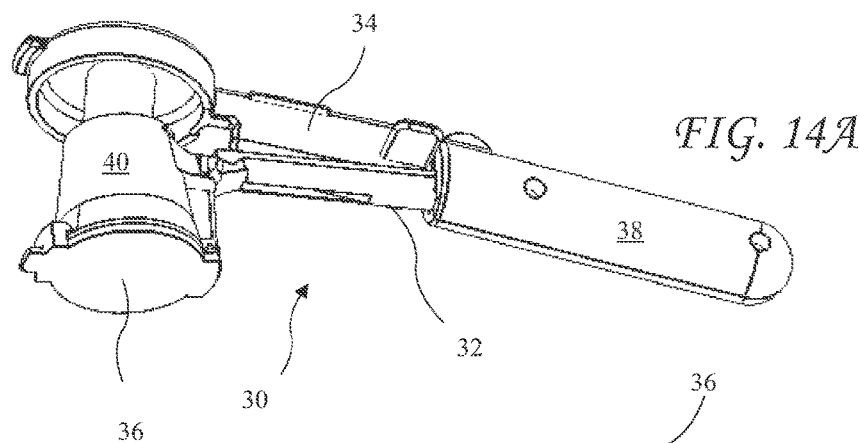
FIG. 14A
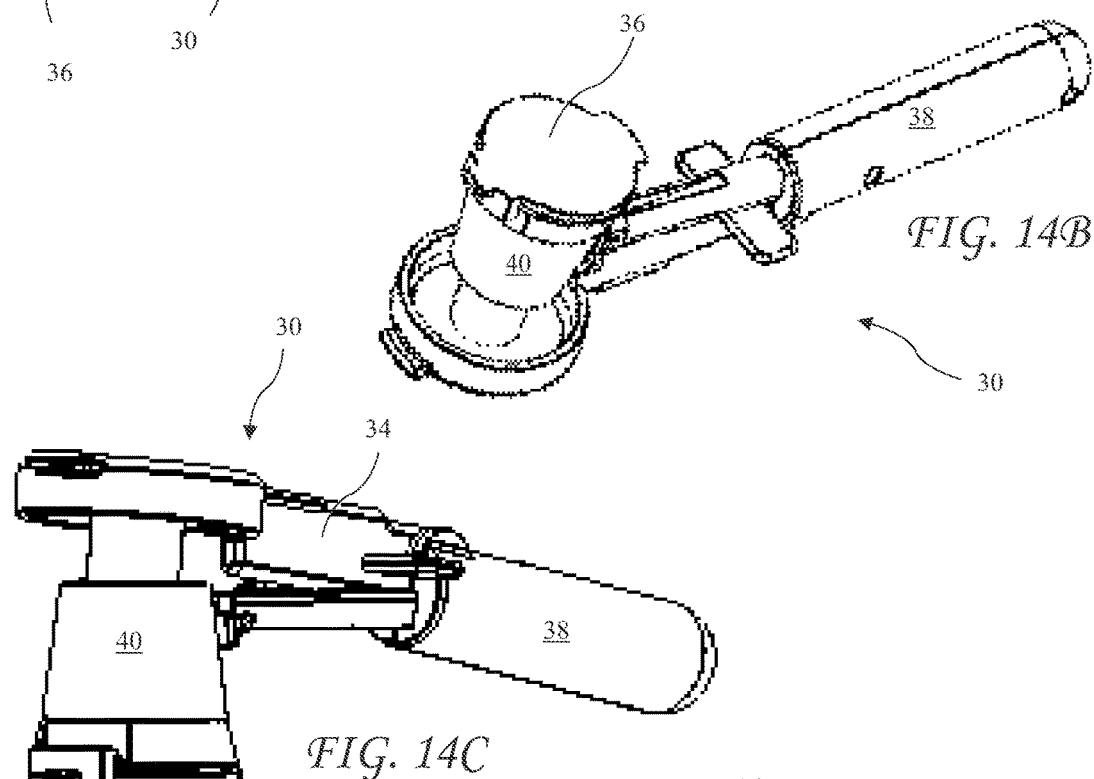
FIG. 14B
FIG. 14C
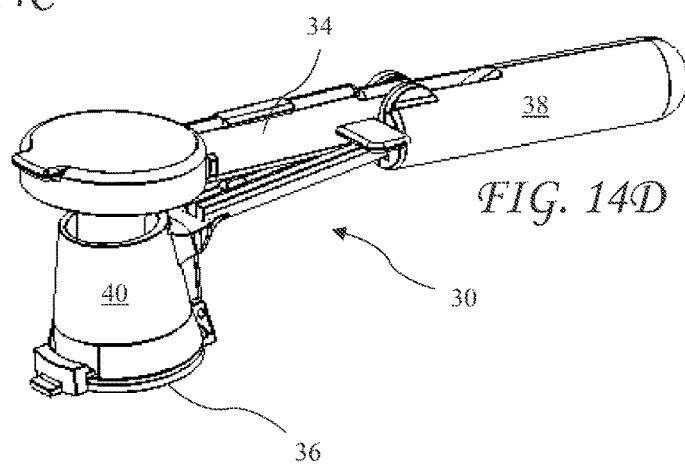
FIG. 14D

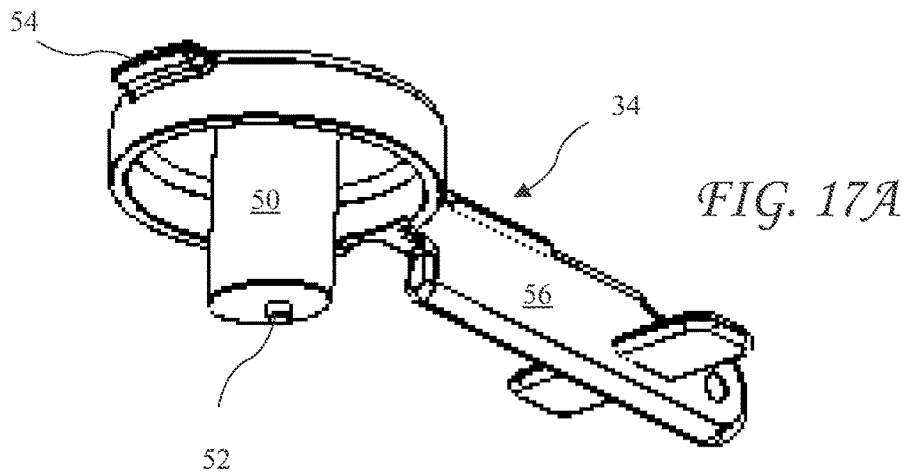
FIG. 17A
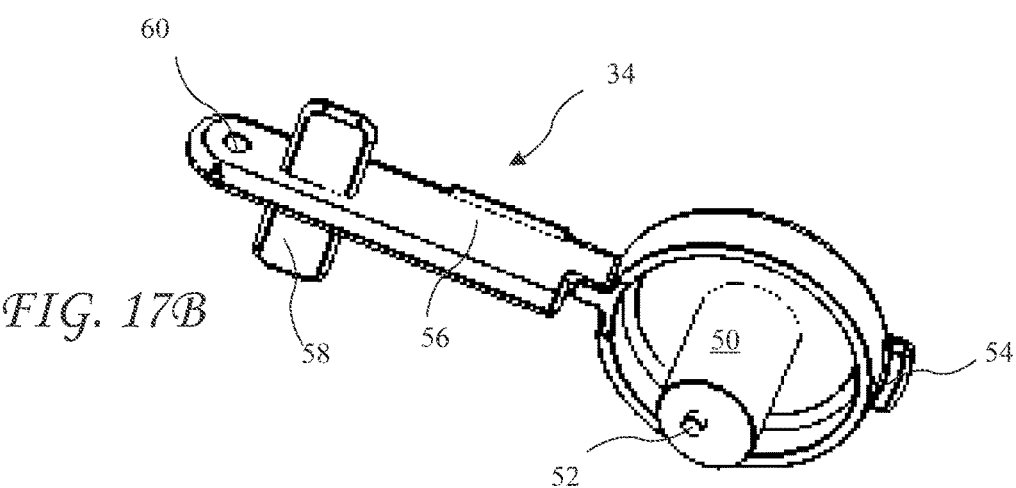
FIG. 17B
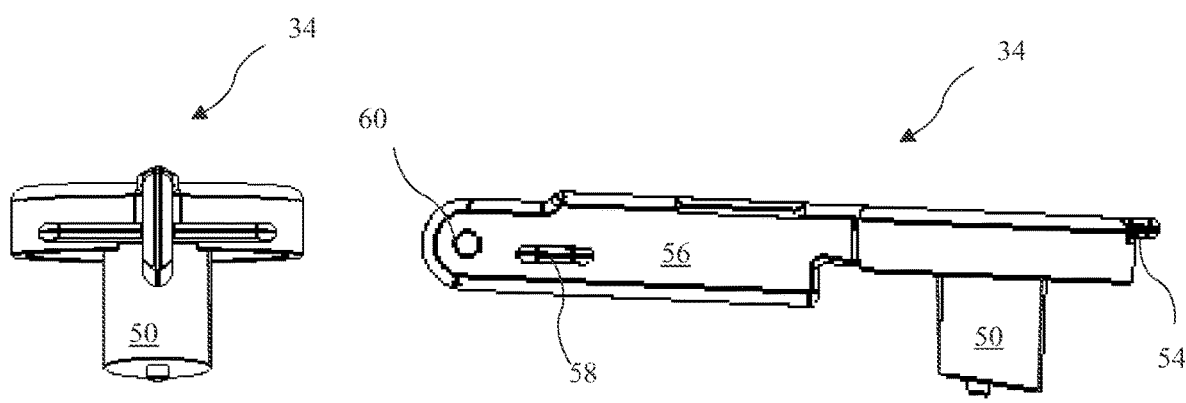
FIG. 18B
FIG. 18A

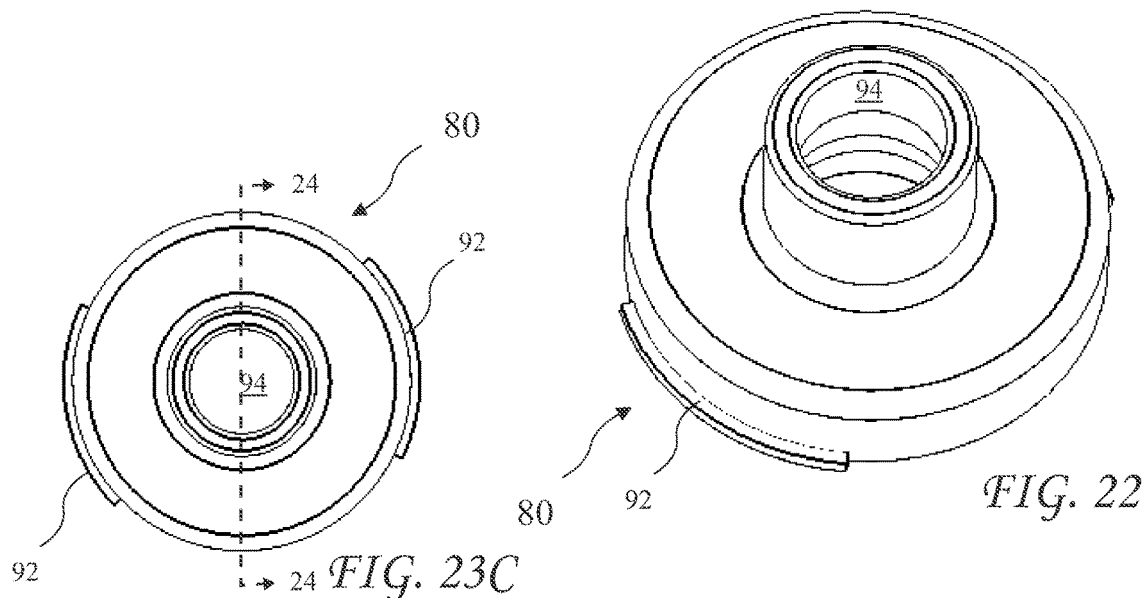
FIG. 23C
FIG. 22
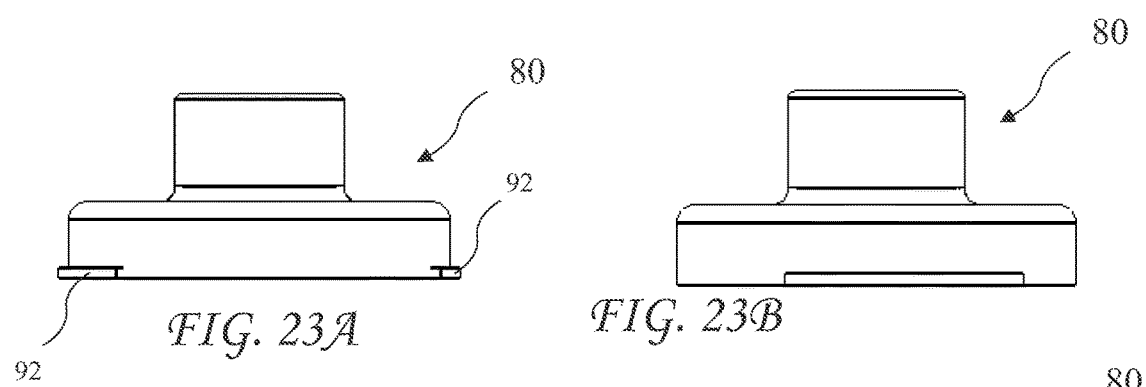
FIG. 23A
FIG. 23B
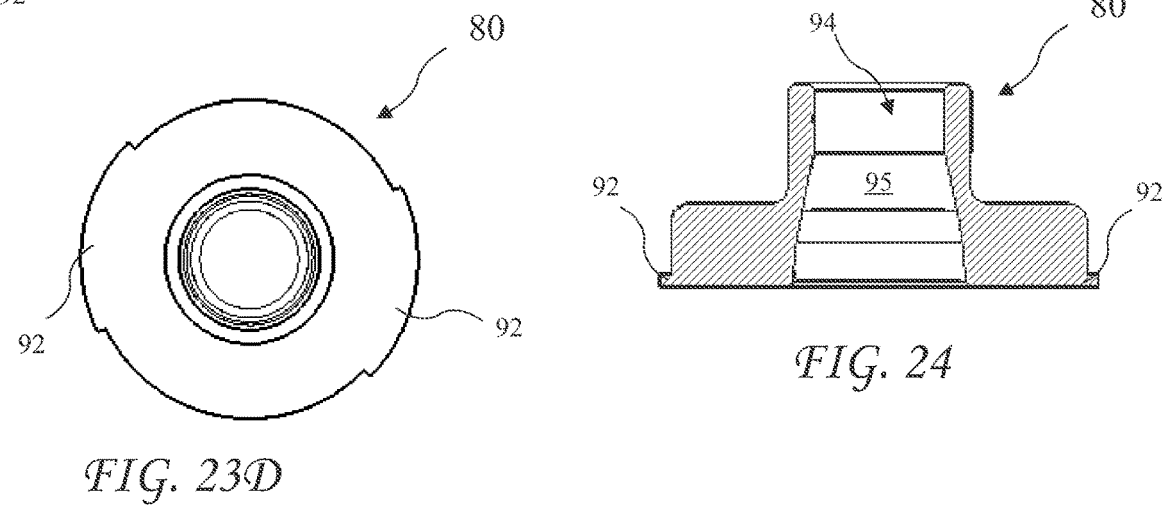
FIG. 23D
FIG. 24

METHOD OF CONSTRUCTING A BEVERAGE BREWING CARTRIDGE

CROSS-REFERENCE TO RELATED APPLICATIONS

This is a divisional of U.S. patent application Ser. No. 17/163,121, which was filed on Jan. 29, 2021, which in turn is a continuation-in-part of co-pending U.S. patent application Ser. No. 15/256,929, which was filed on Sep. 6, 2016, which in turn is a continuation-in-part of U.S. patent application Ser. No. 15/187,444, which was filed on Jun. 20, 2016, the disclosures of which are incorporated herein in their entireties.

FIELD OF THE INVENTION

The present invention relates to brewed beverages and in particular to brewing cartridges, and to methods of constructing brewing cartridges.

BACKGROUND OF THE INVENTION

Many beverages are brewed by passing water or other liquid through beverage brewing material, which is typically ground. For example, espresso beverages are typically made by forcing high pressure water through tightly packed, finely ground coffee. For brewing, freshly ground coffee is contained in a holder commonly called a "portafilter", or previously ground coffee is contained in a pre-packaged espresso cartridge. High-pressure water is forced through the ground coffee in the container and the beverage is extracted in small, concentrated amounts. Many espresso drinkers prefer the simplicity of using the pre-packaged espresso cartridges, but are limited in the selection of ground coffee to varieties available in the cartridges, and the cost per beverage of drinks made from pre-packaged cartridges is greater than that of drinks prepared fresh. This tradeoff is common for any type of brewed beverage.

BRIEF SUMMARY OF THE INVENTION

According to an aspect of the invention, a beverage brewing cartridge includes a cartridge base and a plug. The cartridge base includes a sidewall having a first open sidewall end and a second open sidewall end, and a cover configured to be sealed or otherwise attached to a rim of the first open sidewall end (or already sealed or otherwise attached to the rim). The plug is configured to be inserted into the second open sidewall end. The beverage brewing cartridge is configured to hold beverage brewing material when the cover is sealed to the rim of the first open sidewall end and the plug is inserted into the second open sidewall end. The cover is configured to be breached to allow pressurized liquid to enter the beverage brewing cartridge to brew a beverage. The plug includes weakened areas configured to open after the pressurized liquid enters the beverage brewing cartridge to allow the brewed beverage to flow from the beverage brewing cartridge. The cover can include foil.

The plug can include a first cooperative element, the second open sidewall end can include a second cooperative element, and the first and second cooperative elements can be configured to mutually engage to removably couple the plug to the sidewall when the plug is inserted into the second open sidewall end. For example, the first cooperative element can include a peripheral recess, and the second cooperative element can include a peripheral ridge. The plug can also include a peripheral lip spaced from the peripheral recess. The circumferential lip can include gaps configured to allow the circumferential lip to collapse during insertion of the plug into the second open sidewall end.

The beverage brewing cartridge can be provided fully constructed, in which case the plug is arranged in the second open sidewall end, and the beverage brewing cartridge also includes beverage brewing material held within the cartridge base. For example, the beverage brewing material can be ground coffee beans.

According to another aspect of the invention, a method of constructing the beverage brewing cartridge can include sealing or otherwise attaching the cover to the rim of the first open sidewall end (if it is not already sealed or otherwise attached), placing the cartridge base in a holder, inserting a portion of beverage brewing material into the cartridge base through the second open sidewall end, tamping the brewing material in the cartridge base through the second open sidewall end, and inserting the plug into the second open sidewall end.

Placing the cartridge base in a holder can include opening a lid of a cartridge holder of a hand-held cartridge tool, inserting the cartridge base into the cartridge holder of the hand-held cartridge tool, the second open sidewall end first, and closing the lid to retain the cartridge base in the cartridge holder.

Placing the cartridge base in a holder can include placing the cartridge base in a cartridge holder attached to a hand-held cartridge tool. Tamping the brewing material in the cartridge base through the second open sidewall end can include pivoting a lever about a pivot of the hand-held cartridge tool to advance a tamping plunger through a mouth of the cartridge holder, wherein the tamping plunger is attached to the lever between the pivot and a lever handle. A tamper/seater can be pivotally attached to the tool to align the tamping plunger. The plug can include a guide hole and the tamping plunger can include a guide hole pin, in which case the method can also include engaging the guide hole pin into the guide hole and pivoting the tamper/seater to press the plug in order to insert the plug into the second open sidewall end.

Placing the cartridge base in a holder can include placing the cartridge base on a cartridge seat of a tool base arranged on a surface, such that the cartridge base cover is arranged against the tool base, and attaching a cartridge lock to the tool base over the cartridge base such that the cartridge lock retains the cartridge base against the tool base. In this case, tamping the brewing material in the cartridge base can include pushing a tamping tool through a mouth of the cartridge lock and the second open sidewall end of the cartridge base. Inserting the plug into the second open sidewall end can include pressing the plug through the mouth of the cartridge lock and the second open sidewall end. Pressing the plug through the mouth of the cartridge lock and the second open sidewall end can include engaging a guide hole pin of a seating tool into a guide hole of the plug, and pushing the seating tool toward the cartridge lock to advance the plug through the mouth of the cartridge lock and into the second open sidewall end.

BRIEF DESCRIPTION OF THE DRAWINGS

FIG. 14A shows a first isometric view of an exemplary hand-held tool according to the present invention.

FIG. 14B shows a second isometric view of an exemplary hand-held tool according to the present invention.

FIG. 14C shows a third isometric view of an exemplary hand-held tool according to the present invention.

FIG. 14D shows a fourth isometric view of an exemplary hand-held tool according to the present invention.

FIG. 17A shows an isometric view of an exemplary tamper/seater of the hand-held tool according to the present invention.

FIG. 17B shows an isometric view of an exemplary tamper/seater of the hand-held tool according to the present invention.

FIG. 18A shows a side view of an exemplary tamper/seater of the hand-held tool according to the present invention.

FIG. 18B shows a rear view of an exemplary tamper/seater of the hand-held tool according to the present invention.

FIG. 22 shows an isometric view of an exemplary cartridge lock according to the present invention.

FIG. 23A shows a side view of an exemplary cartridge lock according to the present invention.

FIG. 23B shows a side view of an exemplary cartridge lock according to the present invention, rotated 90 degrees.

FIG. 23C shows a top view of an exemplary cartridge lock according to the present invention.

FIG. 23D shows a bottom view of an exemplary cartridge lock according to the present invention.

FIG. 24 shows a cross-sectional view of an exemplary cartridge lock according to the present invention, taken along line 24-24 of FIG. 23C.

Corresponding reference characters indicate corresponding components throughout the several views of the drawings.

DETAILED DESCRIPTION OF THE INVENTION

Figure 1:
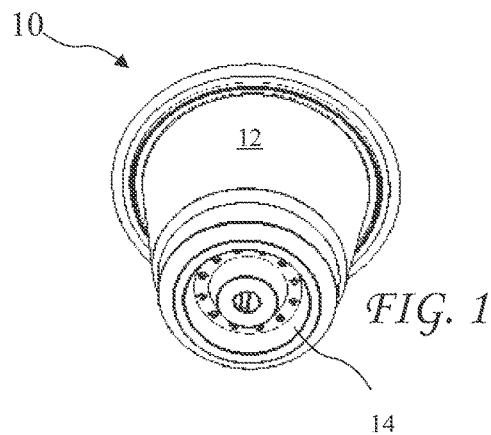
FIG. 1 shows a bottom isometric view of an exemplary cartridge according to the present invention.
Figure 2A:
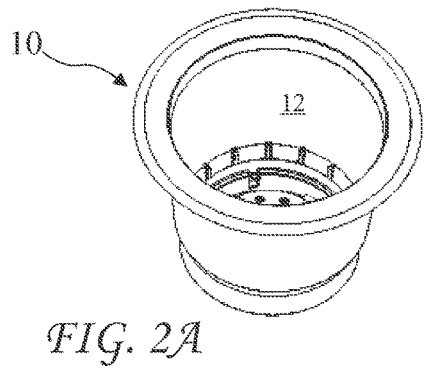
FIG. 2A shows a top isometric view of an exemplary cartridge according to the present invention, with the cartridge base top open.
Figure 3B:
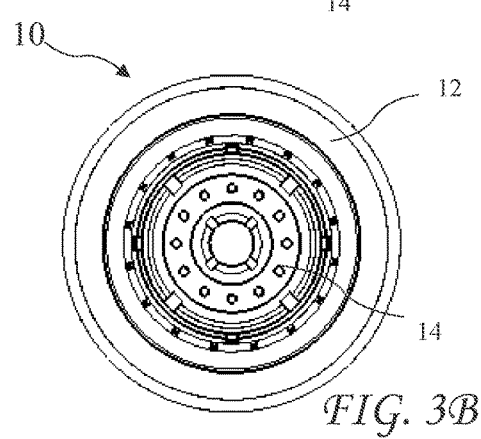
FIG. 3B shows a top view of an exemplary cartridge according to the present invention.
Figure 2B:
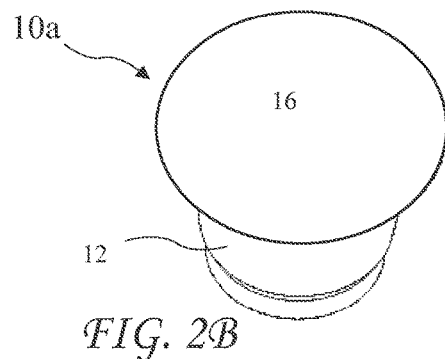
FIG. 2B shows a top isometric view of an exemplary cartridge according to the present invention, with the cartridge base top closed.
Figure 3A:
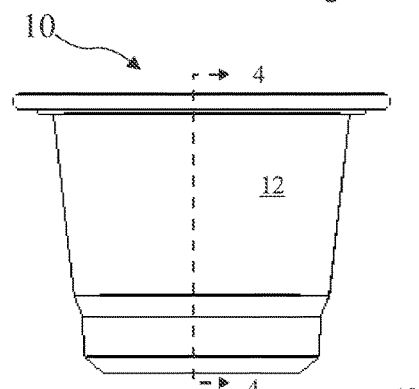
FIG. 3A shows a side view of an exemplary cartridge according to the present invention.
Figure 3C:
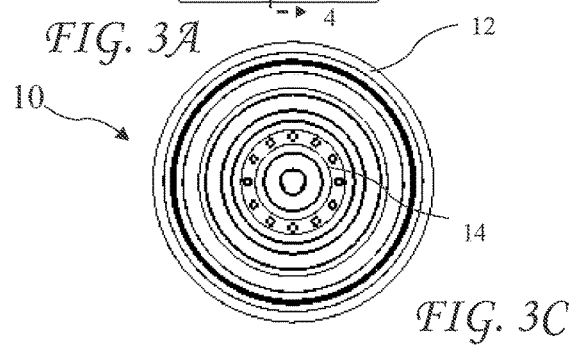
FIG. 3C shows a bottom view of an exemplary cartridge according to the present invention.
Figure 4:
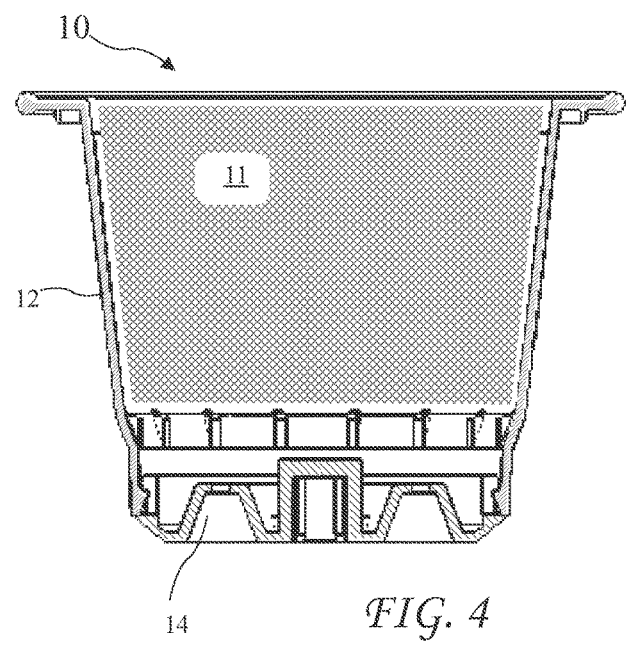
FIG. 4 shows a cross-sectional view of an exemplary cartridge according to the present invention, taken along line 4-4 of FIG. 3A.
Figure 8:
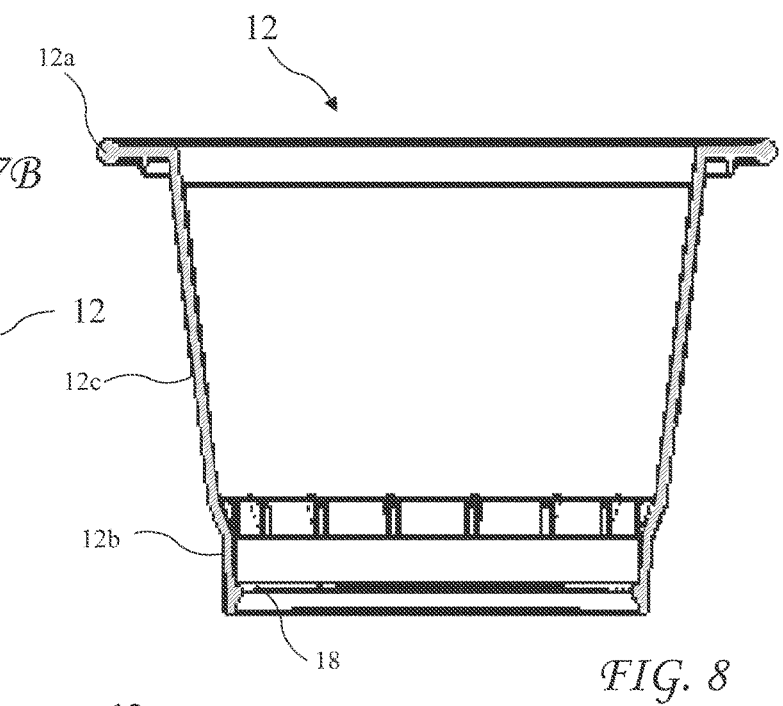
FIG. 8 shows a cross-sectional view of an exemplary cartridge base according to the present invention, taken along line 8-8 of FIG. 7A.
Figure 7C:
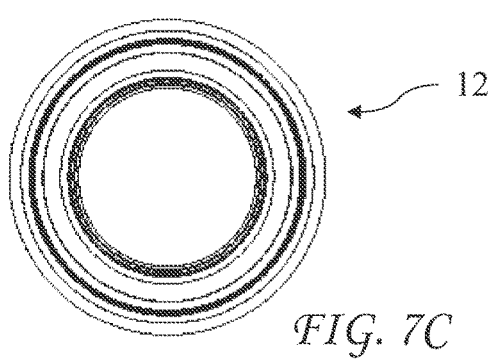
FIG. 7C shows a bottom view of an exemplary cartridge base according to the present invention.

FIGS. 1-4 show various views of an exemplary cartridge 10 according to the present invention; FIG. 1 a bottom isometric view, FIG. 2A a top isometric view with the cartridge base top 12a (see FIG. 8) open, FIG. 2B a top isometric view with the cartridge base top 12a closed, FIG. 3A a side view, FIG. 3B a top view, FIG. 3C a bottom view, and FIG. 4 a cross-sectional view taken along line 4-4 of FIG. 3A, containing brewing material 11. The cartridge 10 is configured to be at least partially filled with finely ground beverage brewing material 11 such as ground coffee beans, and includes a cartridge base 12, a plug 14, and, optionally, a pierceable cover 16. The cartridge is preferably filled through an open cartridge base bottom 12b (see FIG. 8) of the cartridge base 12, and the open cartridge base bottom 12b is closed off by the plug 14 after filling. The cartridge 10 can be provided with the cartridge base top 12a open, or with the cover 16, made of a foil material or the like, sealing the cartridge base top 12a. When the cartridge is provided with the cartridge base top 12a open, the cover 16 can be sealed or otherwise attached to the cartridge base 12 before filling the cartridge 10 with brewing material. The plug 14 is inserted into the open cartridge base bottom 12b after filling the cartridge 10. Thus, once constructed, the cartridge 10 contains brewing material 11, has the cartridge base top 12a sealed by the cover 16 and has the cartridge base bottom 12b closed off by the plug 14.

Figure 5:
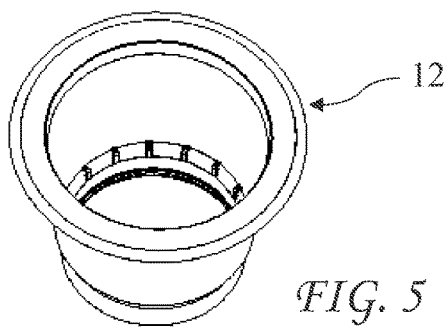
FIG. 5 shows a top isometric view of an exemplary cartridge base according to the present invention.
Figure 6:
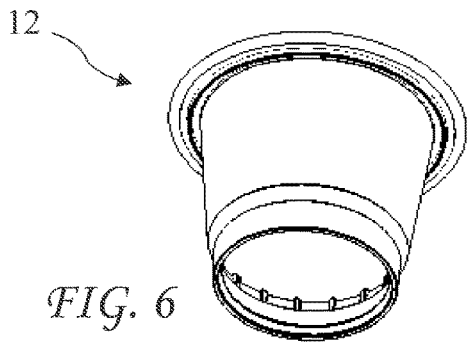
FIG. 6 shows a bottom isometric view of an exemplary cartridge base according to the present invention.
Figure 7B:
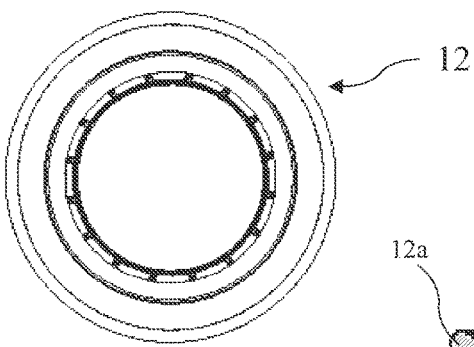
FIG. 7B shows a top view of an exemplary cartridge base according to the present invention.
Figure 7A:
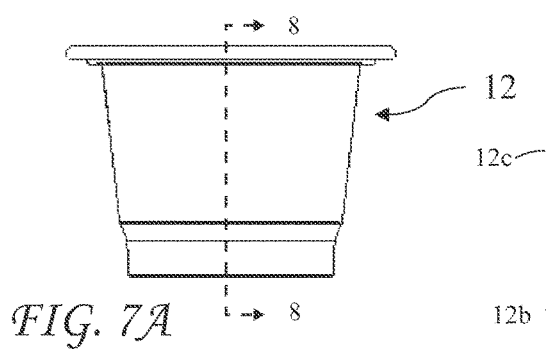
FIG. 7A shows a side view of an exemplary cartridge base according to the present invention.
Figure 9B:
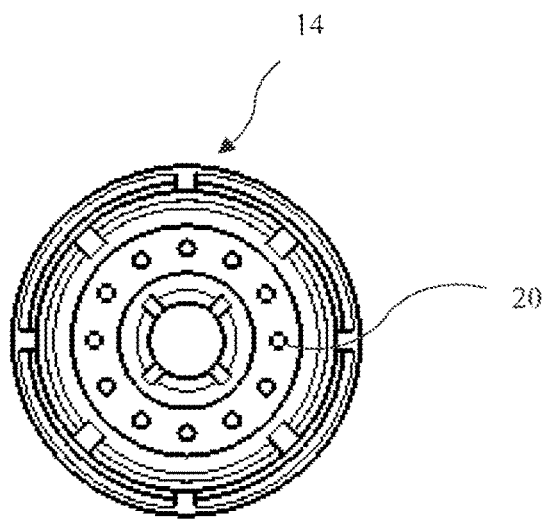
FIG. 9B shows a top view of an exemplary plug according to the present invention.
Figure 9A:
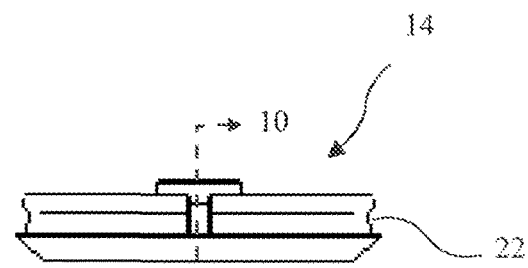
FIG. 9A shows a side view of an exemplary plug according to the present invention.
Figure 10:
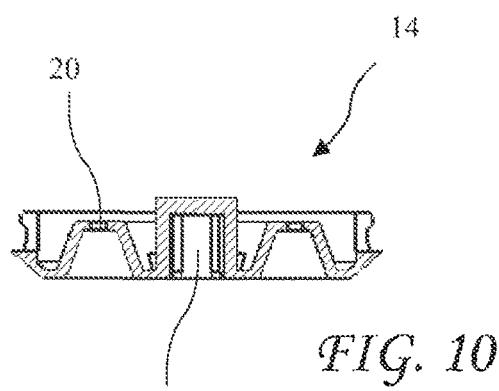
FIG. 10 shows a cross-sectional view of an exemplary plug according to the present invention, taken along line 10-10 of FIG. 9A.
Figure 9C:
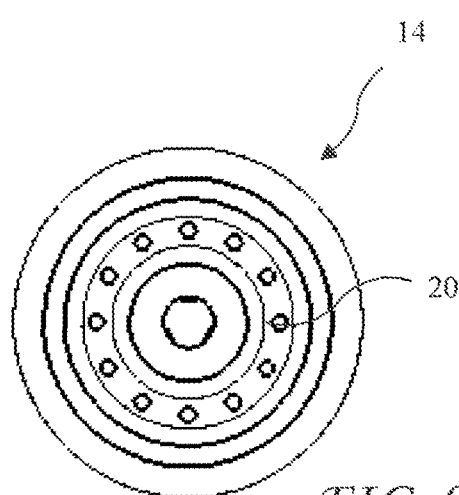
FIG. 9O shows a bottom view of an exemplary plug according to the present invention.
Figure 11:
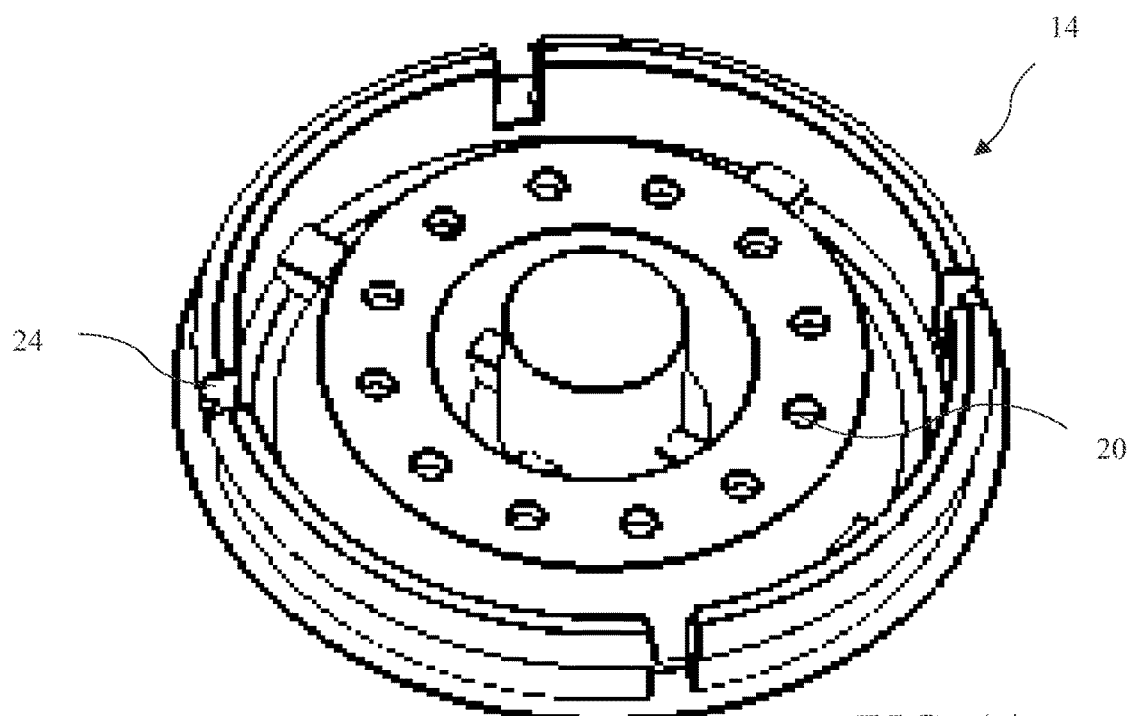
FIG. 11 shows a detailed top isometric view of an exemplary plug according to the present invention.
Figure 12:
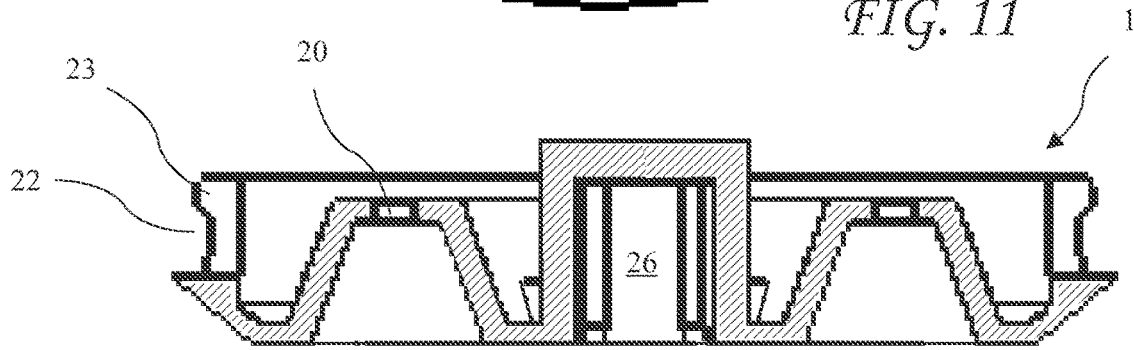
FIG. 12 shows a detailed cross-sectional view of an exemplary plug according to the present invention, taken along line 10-10 of FIG. 9A.
Figure 13:
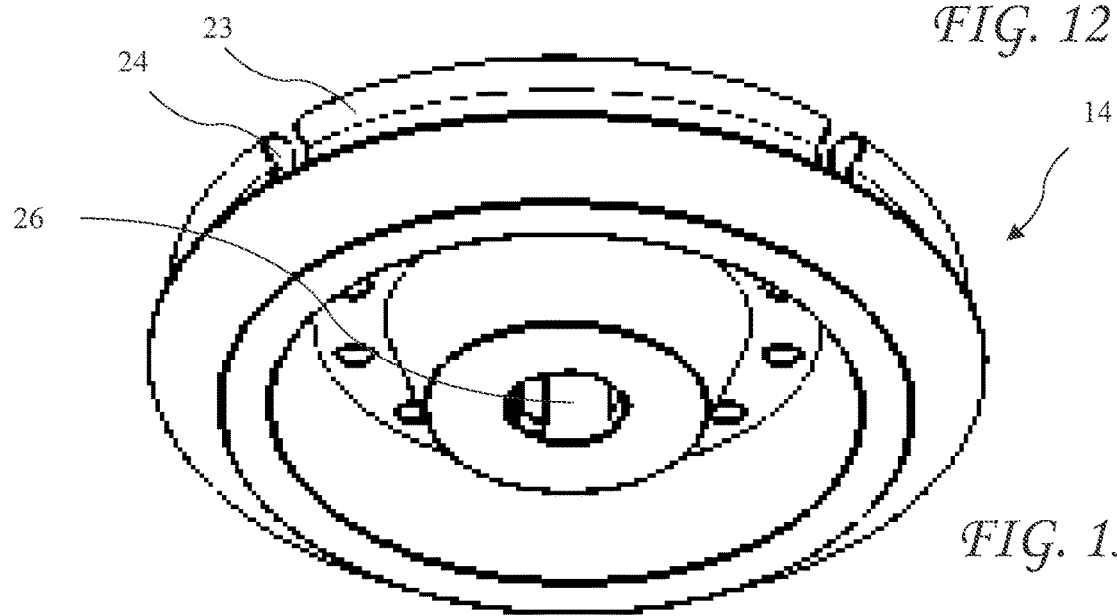
FIG. 13 shows a detailed bottom isometric view of an exemplary plug according to the present invention.

FIGS. 5-8 show various views of an exemplary cartridge base 12 according to the present invention; FIG. 5 a top isometric view, FIG. 6 a bottom isometric view, FIG. 7A a side view, FIG. 7B a top view, FIG. 7C a bottom view, and FIG. 8 a cross-sectional view taken along line 8-8 of FIG. 7A. The cartridge base 12 includes a sidewall 12c, which is preferably frustoconical in shape as shown, but can be cylindrical or any other shape, terminating at one end in the base top 12a, and at the other end in the open base bottom 12b. Preferably, the base bottom 12b has a smaller diameter than the base top 12a, although this is not necessarily the case. An interior annular ridge 18 in the base bottom 12b is configured to engage an exterior annular recess 22 (see FIG. 9A) in the plug 14 to retain the plug 14 in the base bottom 12b. However, any cooperating features can be included on the base bottom 12b and the plug 14 to retain the plug 14.

FIGS. 9-13 show various views of an exemplary plug 14 according to the present invention; FIG. 9A a side view, FIG. 9B a top view, FIG. 9C a bottom view, FIG. 10 a cross-sectional view taken along line 10-10 of FIG. 9A, FIG. 11 a detailed top isometric view, FIG. 12 a detailed cross-sectional view taken along line 10-10 of FIG. 9A, and FIG. 13 a detailed bottom isometric view. The plug 14 defines the exterior annular recess 22 created by a lip 23 above the exterior annular recess 22. The lip 23 includes gaps 24 allowing the lip 24 to slightly distort when the plug 14 is pressed into the open base bottom 12b. The plug 14 further includes ports or weakened areas 20. When espresso is brewed, the brewed beverage escapes from the cartridge 10 through the ports or weakened areas 20. The weakened areas 20 help seal the cartridge 10 before use. The plug 14 further can include a guide hole 26. The guide hole 26 engages a guide hole pin 52 (see FIG. 17A) to hold the plug during assembly of the cartridge 10.

FIGS. 14A-14D show isometric views of an exemplary hand-held tool 30 according to the present invention. The tool 30 includes a frame 32, a handle 38 attached to the frame 32 for grasping by a user, a cartridge holder 40, a cartridge hole lid 36, and a tamper/seater 34. The cartridge base 12 is held in the cartridge holder 40 to fill, tamp, and plug the cartridge 12 to construct an espresso cartridge 10 or other beverage cartridge.

Figure 15:
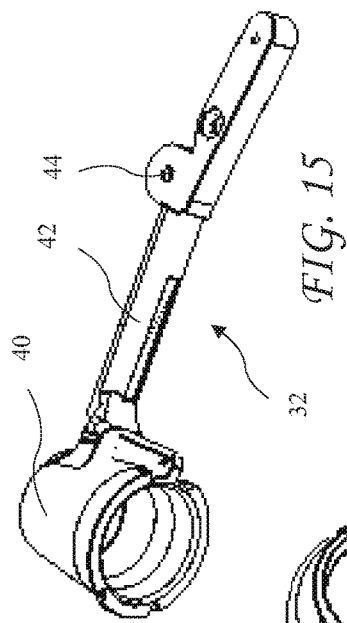
FIG. 15 shows an isometric view of a frame of an exemplary hand-held tool according to the present invention.
Figure 16E:
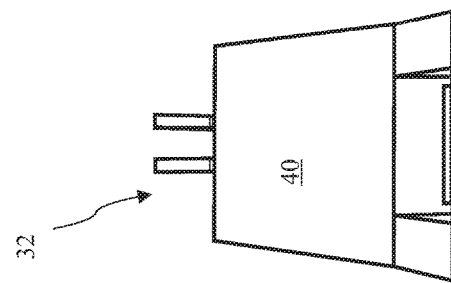
FIG. 16E shows a front view of the frame of an exemplary hand-held tool according to the present invention.
Figure 16B:
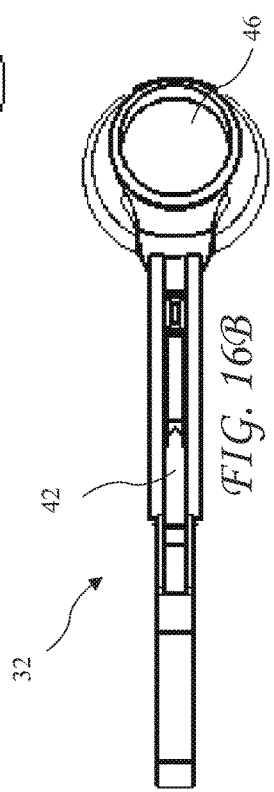
FIG. 16B shows a top view of the frame of an exemplary hand-held tool according to the present invention.
Figure 16A:
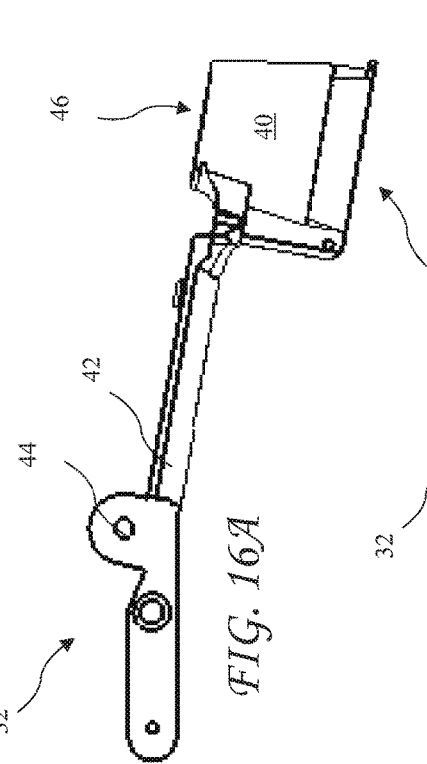
FIG. 16A shows a side view of the frame of an exemplary hand-held tool according to the present invention.
Figure 16C:
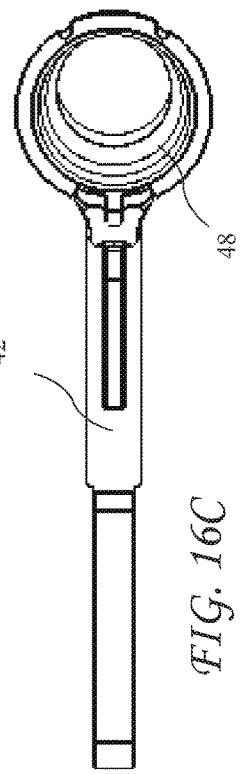
FIG. 16C shows a bottom view of the frame of an exemplary hand-held tool according to the present invention.
Figure 16D:
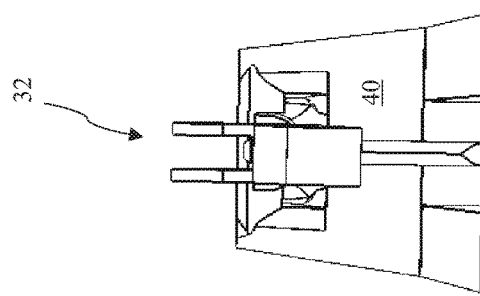
FIG. 16D shows a rear view of the frame of an exemplary hand-held tool according to the present invention.

FIGS. 15 and 16 show various views of an exemplary frame 32 of the hand-held tool 30 according to the present invention; FIG. 15 an isometric view, FIG. 16A a side view, FIG. 16B a top view, FIG. 16C a bottom view, FIG. 16D a rear view, and FIG. 16E a front view. The frame 32 includes the cartridge holder 40, an arm 42 extending from the cartridge holder 40 to the handle 38, and pivot hands 44. The cartridge holder 40 has an open scoop mouth 46 and an open cartridge mouth 48, which can be closed by the lid 36 after placing the cartridge base 12 in the cartridge holder 40. The cartridge holder 40 can have a cylindrical, frustoconical, or other shaped exterior profile, preferably matching the walls 12c of the cartridge base 12.

FIGS. 17 and 18 show various views of an exemplary tamper/seater 34 of the hand-held tool 30 according to the present invention; FIG. 17A a first isometric view, FIG. 17B a second isometric view, FIG. 18A shows a side view, and FIG. 18B a rear view. The tamper/seater 34 provides mechanism for two steps of making the espresso cartridge 10. A pivot 60 cooperates with the pivot hands 44 of the frame 32 allowing the tamper/seater 34 to pivot toward and away from the cartridge holder 40. A tamping plunger 50 is pushed into the cartridge holder 40 to tamp brewing material in the cartridge base 12. After tamping, the tamping plunger 50 is used to press the plug 14 into the cartridge base 12. The tamping plunger 50 can include the guide hole pin 52 to attach the plug 14 to the tamping plunger 50 to hold the plug 14 aligned with the cartridge base bottom 12b while pressing the plug 14 into the cartridge base bottom 12b. The tamper/seater 34 can include wings 58 facilitating one-handed operation of the tool 30. A tamper arm 56 connects the pivot 60 to the tamper plunger 50.

Figure 19A:
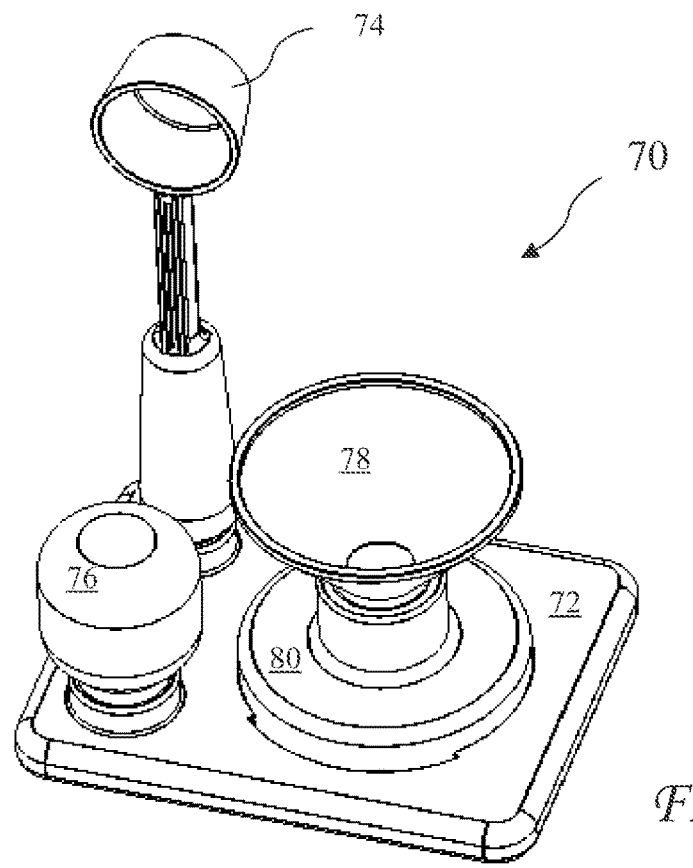
FIG. 19A shows an isometric view of an exemplary counter-top tool according to the present invention.
Figure 19B:
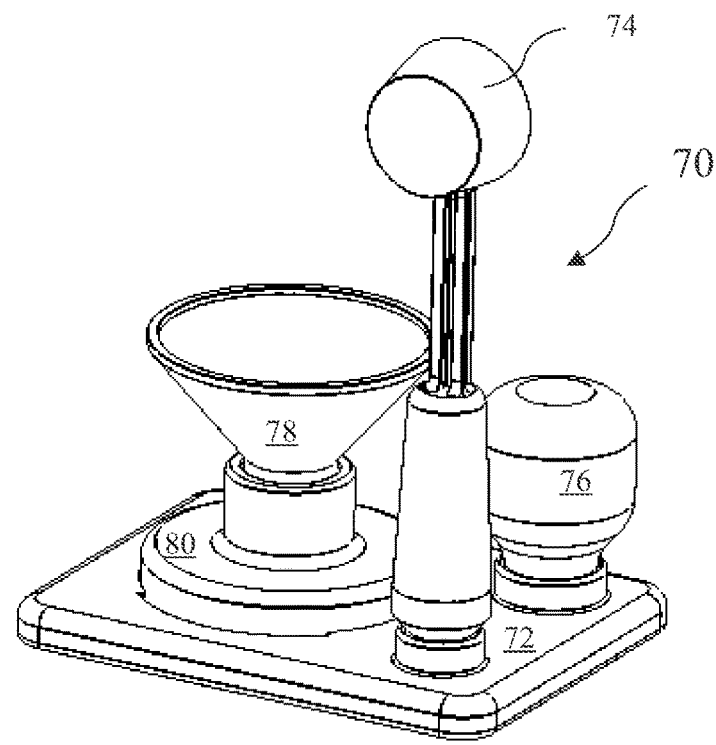
FIG. 19B shows an isometric view of an exemplary counter-top tool according to the present invention.

FIGS. 19A and 19B show first and second isometric views of an exemplary counter-top tool 70 according to the present invention. The counter-top tool includes a tool base 72, a cartridge lock 80 that retains the cartridge base 12 on the tool base 72, a funnel 78 configured to fill the cartridge base 12, a combination scoop and tamper 74 configured to measure and pour brewing material, and a seating tool 76 configured to seat the plug after filling the cartridge base 12 with the brewing material.

Figure 20A:
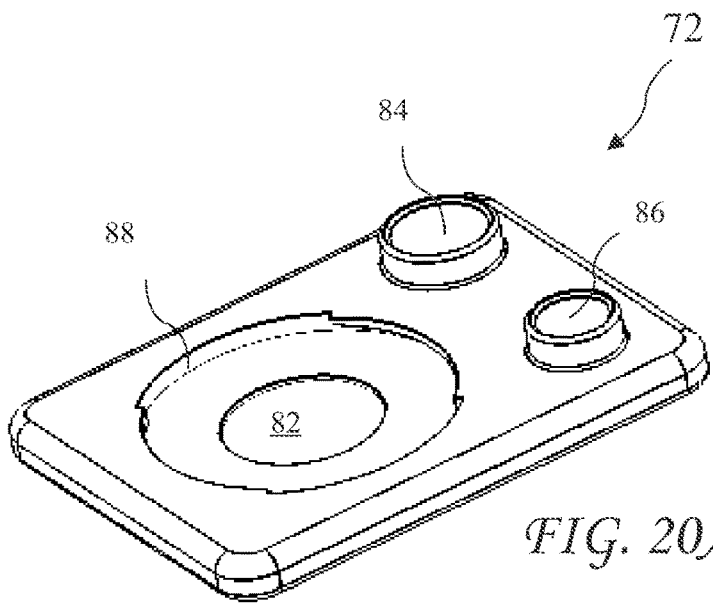
FIG. 20A shows an exemplary tool base of the counter-top tool according to the present invention.
Figure 20B:
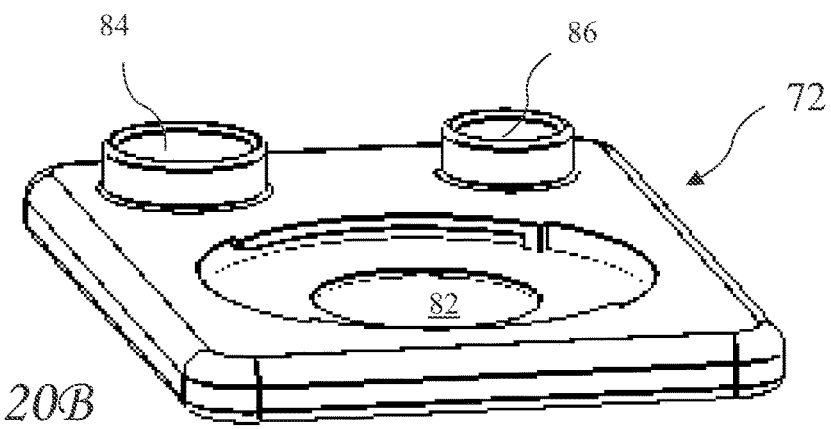
FIG. 20B shows an exemplary tool base of the counter-top tool according to the present invention.
Figure 20C:
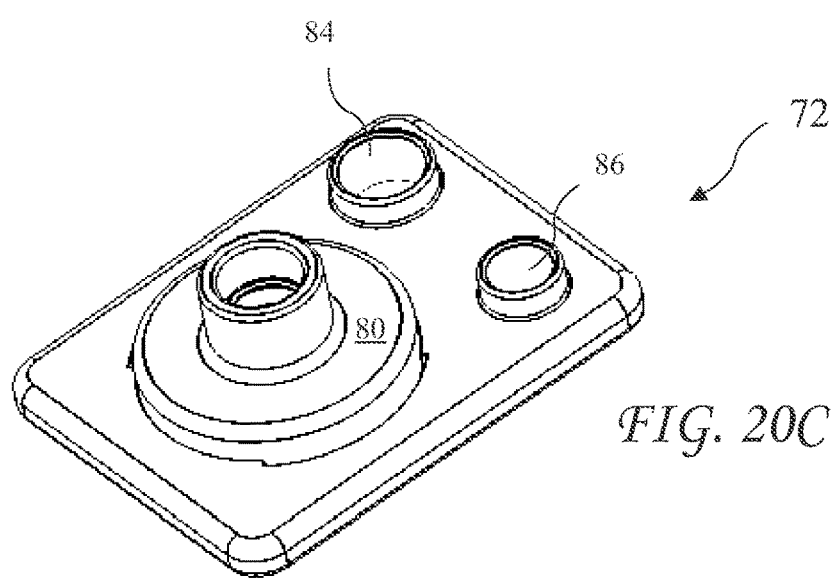
FIG. 20C shows an exemplary tool base of the counter-top tool according to the present invention with an exemplary cartridge lock according to the present invention attached to the tool base.
Figure 21C:
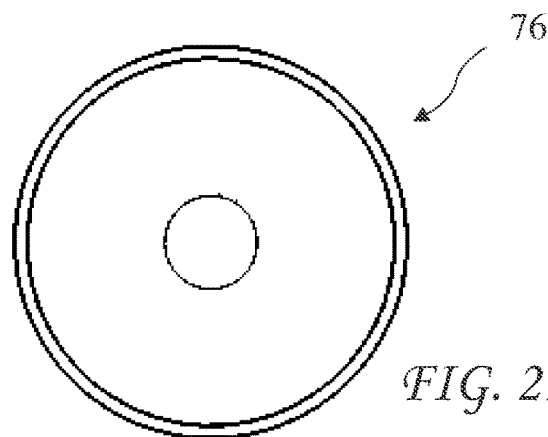
FIG. 21C shows a top view of an exemplary funnel according to the present invention.
Figure 21A:
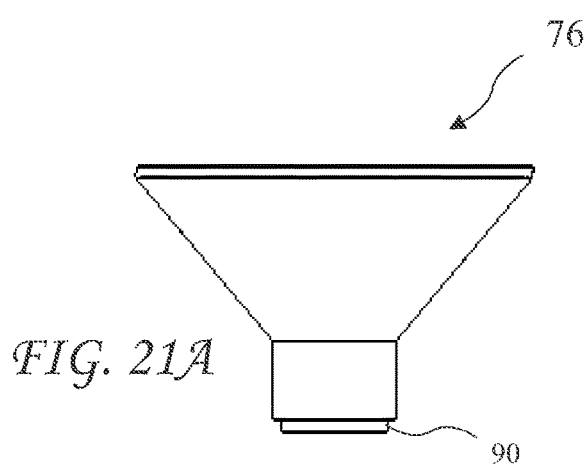
FIG. 21A shows a side view of an exemplary funnel according to the present invention.
Figure 21B:
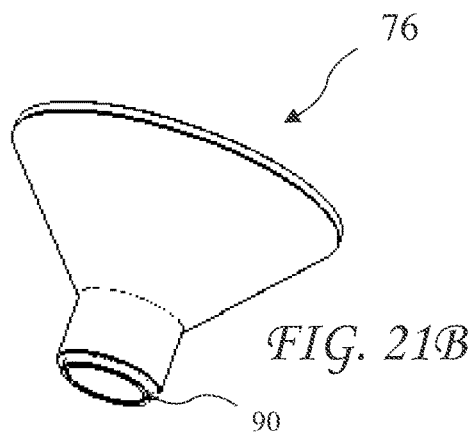
FIG. 21B shows an isometric view of an exemplary funnel according to the present invention.
Figure 21D:
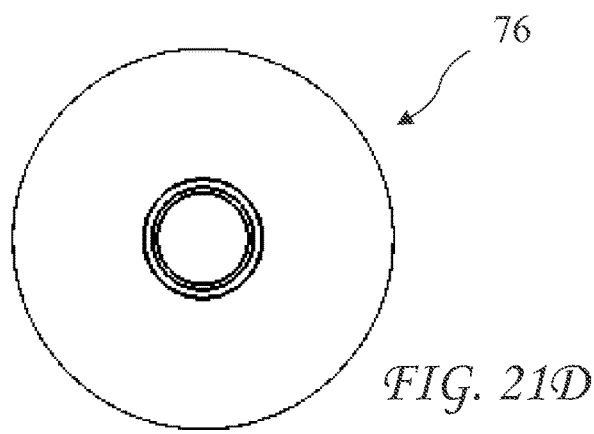
FIG. 21D shows a bottom view of an exemplary funnel according to the present invention.

FIGS. 20A-C show various views of an exemplary tool base 72 of the counter-top tool 70 according to the present invention. The tool base 72 includes a cartridge seat 82 slightly larger than the cartridge top 12a to position the cartridge 12 on the tool base 72. Locking recesses 88 are formed around the cartridge seat 82 to attach a cartridge lock 80 (see FIGS. 22-24) to the tool base 72 to hold the cartridge base 12 on the tool base 71. A recess 84 is formed on the tool base 72 to position or store the seating tool 76 when not in use and a recess 86 is formed to position or store the scoop and tamper 74 when not in use.

FIGS. 21A-D show various views of an exemplary funnel 76 according to the present invention. The funnel 76 fits into an access mouth 94 (see FIG. 24) of the cartridge lock 80. The funnel 76 can include a step 90 to align the funnel with the open base bottom 12b, or can be tapered to align the funnel with the open base bottom 12b.

FIGS. 22-24 show various views of an exemplary cartridge lock 80 according to the present invention; FIG. 22 an isometric view, FIG. 23A a side view, FIG. 23B a side view, FIG. 23C a top view, FIG. 23D a bottom view, and FIG. 24 a cross-sectional view, taken along line 24-24 of FIG. 23C. The cartridge lock 80 includes locking ring segments 92 that engage the locking recesses 88 of the tool base 72 to retain the cartridge lock 80 and the cartridge base 12 on the tool base 72. The cartridge lock 80 includes a frustoconical shaped interior 95 positioning the cartridge base in the cartridge lock 80 for filling, tamping, and seating the plug 14.

Figure 25A:
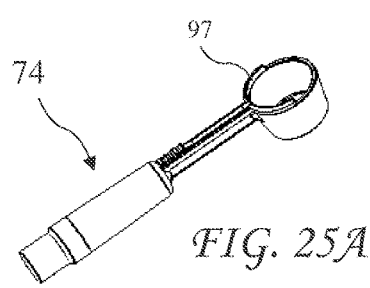
FIG. 25A shows an exemplary scoop and tamper tool according to the present invention, with an exemplary retracted leveling fork according to the present invention.
Figure 25B:
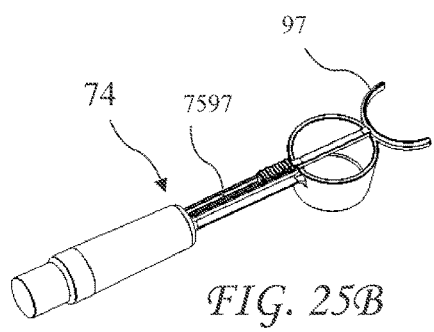
FIG. 25B shows an exemplary scoop and tamper tool according to the present invention, with an exemplary extended leveling fork according to the present invention.
Figure 26:
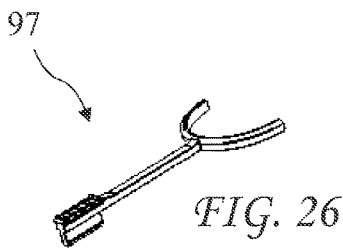
FIG. 26 shows an isometric view of an exemplary leveling fork according to the present invention.

FIGS. 25 and 26 show various views of an exemplary scoop and tamper tool 74 according to the present invention; FIG. 25A with a retracted leveling fork 97, FIG. 25B with an extended leveling fork 97, and FIG. 26 with an isometric view of the leveling fork 97. The leveling fork 97 slides in a slot 75 in the scoop and tamper tool 74. After scooping a portion of brewing material 11 (see FIG. 4), the leveling fork 97 can be guided forward to push excess brewing material off the scoop and tamper tool 74 to obtain a consistent amount of brewing material 11.

Figure 27B:
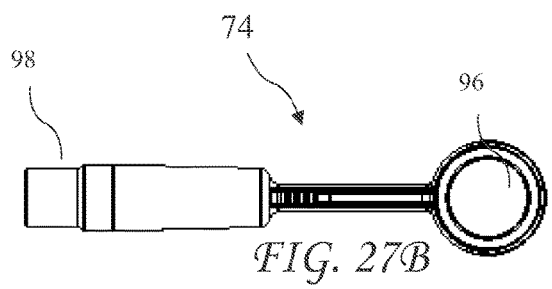
FIG. 27B shows a top view of an exemplary scoop and tamper tool according to the present invention, with an exemplary retracted leveling fork according to the present invention.
Figure 28B:
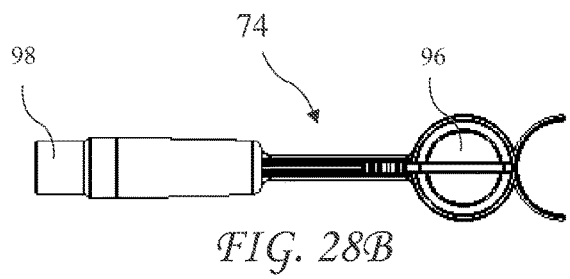
FIG. 28B shows a top view of an exemplary scoop and tamper tool according to the present invention, with an exemplary extended leveling fork according to the present invention.
Figure 27A:
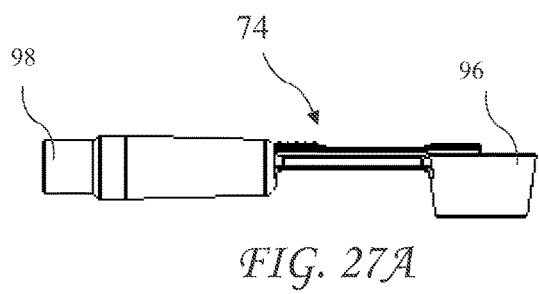
FIG. 27A shows a side view of an exemplary scoop and tamper tool according to the present invention, with an exemplary retracted leveling fork according to the present invention.
Figure 28A:
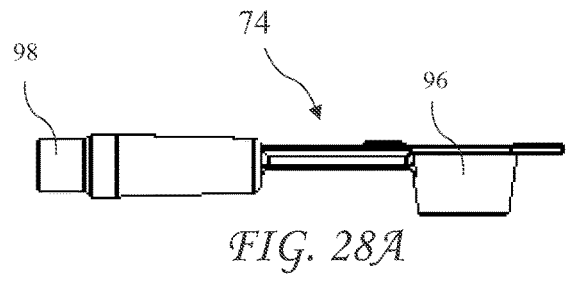
FIG. 28A shows a side view of an exemplary scoop and tamper tool according to the present invention, with an exemplary extended leveling fork according to the present invention.

FIGS. 27 and 28 show various views of an exemplary scoop and tamper tool 74 according to the present invention; FIG. 27A a side view with a retracted leveling fork 97, FIG. 27B a top view with a retracted leveling fork 97, FIG. 28A a side view with an extended leveling fork 97, and FIG. 28B a top view 74 with an extended leveling fork 97.

Figure 29:
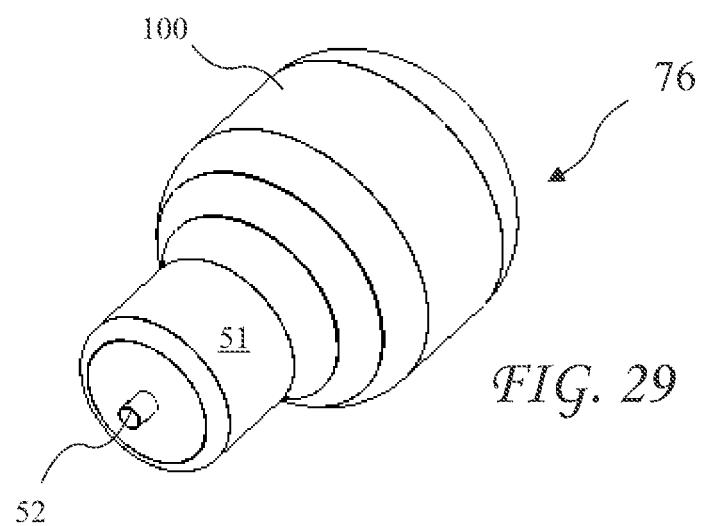
FIG. 29 shows an isometric view of an exemplary seating tool according to the present invention.
Figure 30A:
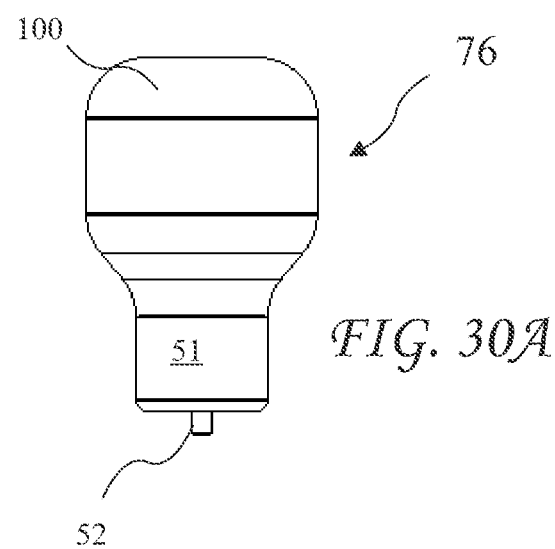
FIG. 30A shows a side view of an exemplary seating tool according to the present invention.
Figure 30B:
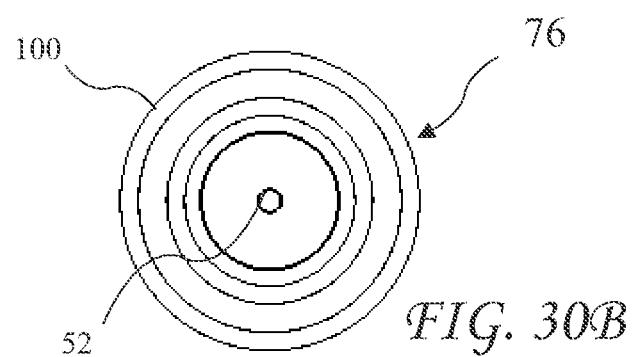
FIG. 30B shows a bottom view of an exemplary seating tool according to the present invention.

FIGS. 29 and 30 show various views of an exemplary seating tool 76 according to the present invention; FIG. 29 an isometric view, FIG. 30A a side view, and FIG. 30B a bottom view. The seating tool 76 includes a cylindrical portion 51 extending from a grasping portion 100. The grasping portion 100 facilitates applying a force required to seat the plug 14 in the open cartridge bottom 12b. A guide hole pin 52 is included to engage the plug 14 to the seating tool 76 to hold the plug 14 aligned with the cartridge base bottom 12b while pressing the plug 14 into the cartridge base bottom 12b.

Figure 31:
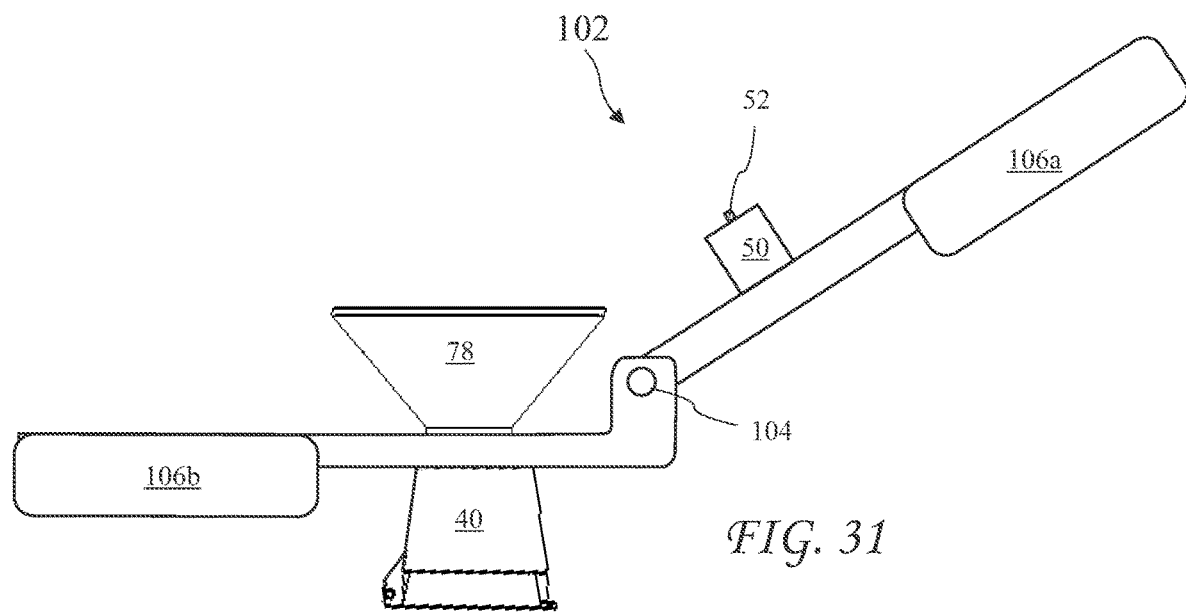
FIG. 31 shows a side view of an exemplary hand-held tool according to the present invention, in an open state.
Figure 32:
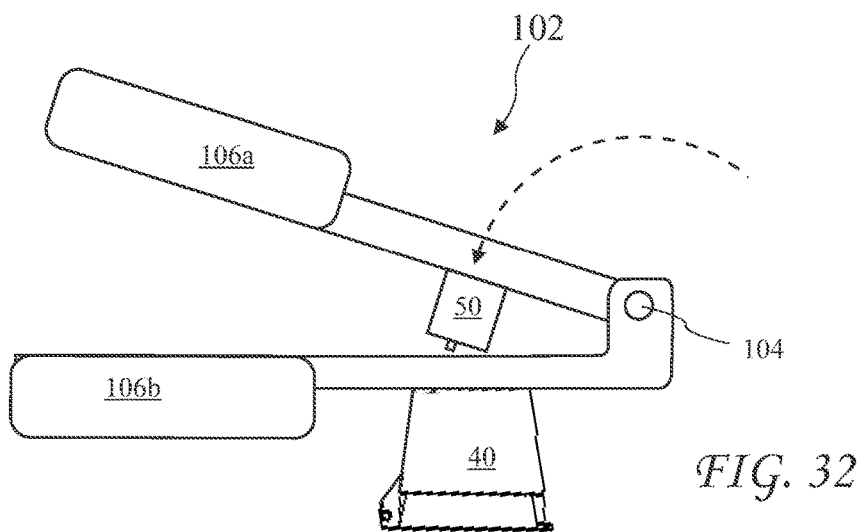
FIG. 32 shows a side view of an exemplary hand-held tool according to the present invention, in a closing state.

FIGS. 31 and 32 show views of an exemplary hand-held tool 102 according to the present invention; FIG. 31 a side view in an open state and FIG. 32 a side view in a closing state. The tool 102 includes a pivot 104 and handles 106a and 106b. The cartridge holder 40 is fixed to one handle 106b, and the tamper plunger 50 is attached to the handle 106a. The cartridge base 12 can be filled using the scoop and tamper 74 as described for the tool 70 above, and the handle 106a can be pivoted first to tamp the brewing material using the tamper plunger 50, and then to seat the plug 14 using the tamper plunger 50, as described for the tool 30 above. The tool 102 advantageously provides leverage during tamping and seating, facilitating use of the tool.

Figure 33:
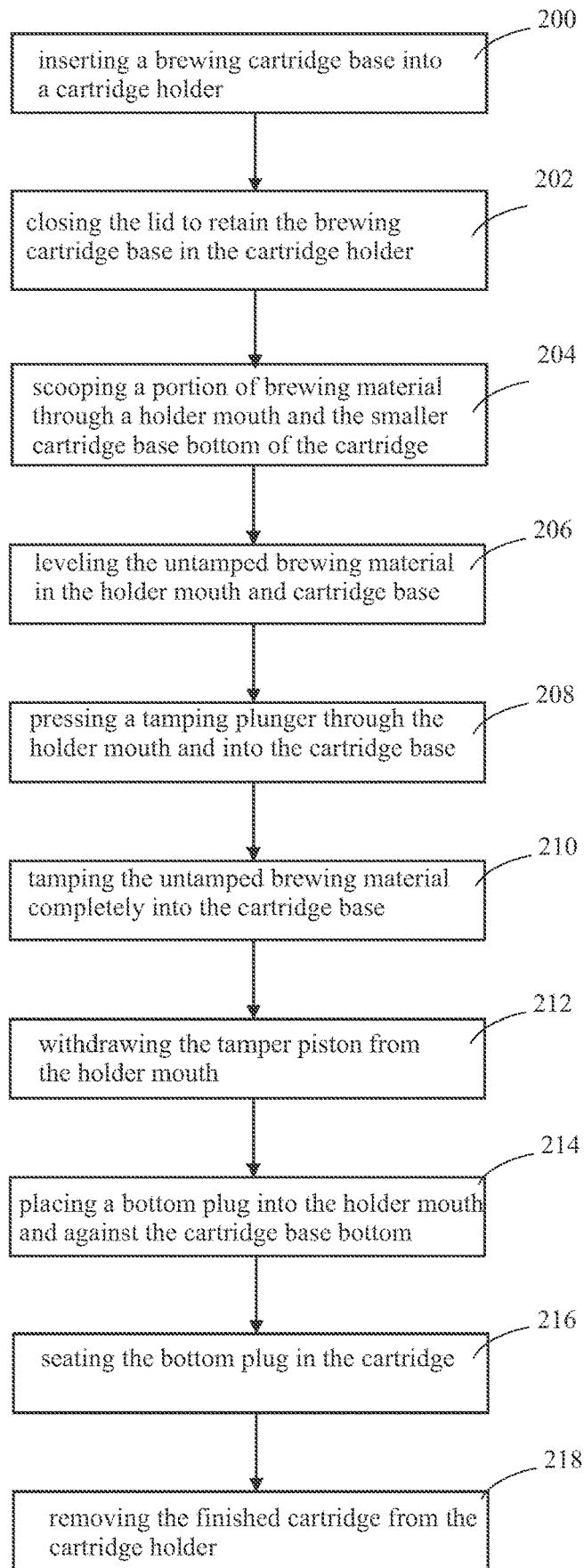
FIG. 33 shows an exemplary method of using a hand-held tool according to the present invention.

FIG. 33 is a flow diagram showing an exemplary method according to the present invention of using a hand-held tool. The method includes inserting a cartridge base into a cartridge holder, an open cartridge base bottom first into the cartridge holder, the cartridge base bottom diameter smaller than a cartridge base top opposite to the cartridge base bottom 200, closing a lid to retain the cartridge base in the cartridge holder 202, scooping a portion of untamped brewing material through a holder mouth and the smaller cartridge base bottom of the cartridge 204, leveling the untamped brewing material in the holder mouth and cartridge base 206, pressing a tamping plunger through the holder mouth and into the cartridge holder 208, tamping the untamped brewing material completely into the cartridge base 210, withdrawing the tamper piston from the holder mouth 212, placing a plug into the holder mouth and against the smaller cartridge base bottom of the cartridge base 214, seating the plug in the smaller base bottom of the cartridge 216, and removing the finished cartridge from the cartridge holder 218.

Figure 34:
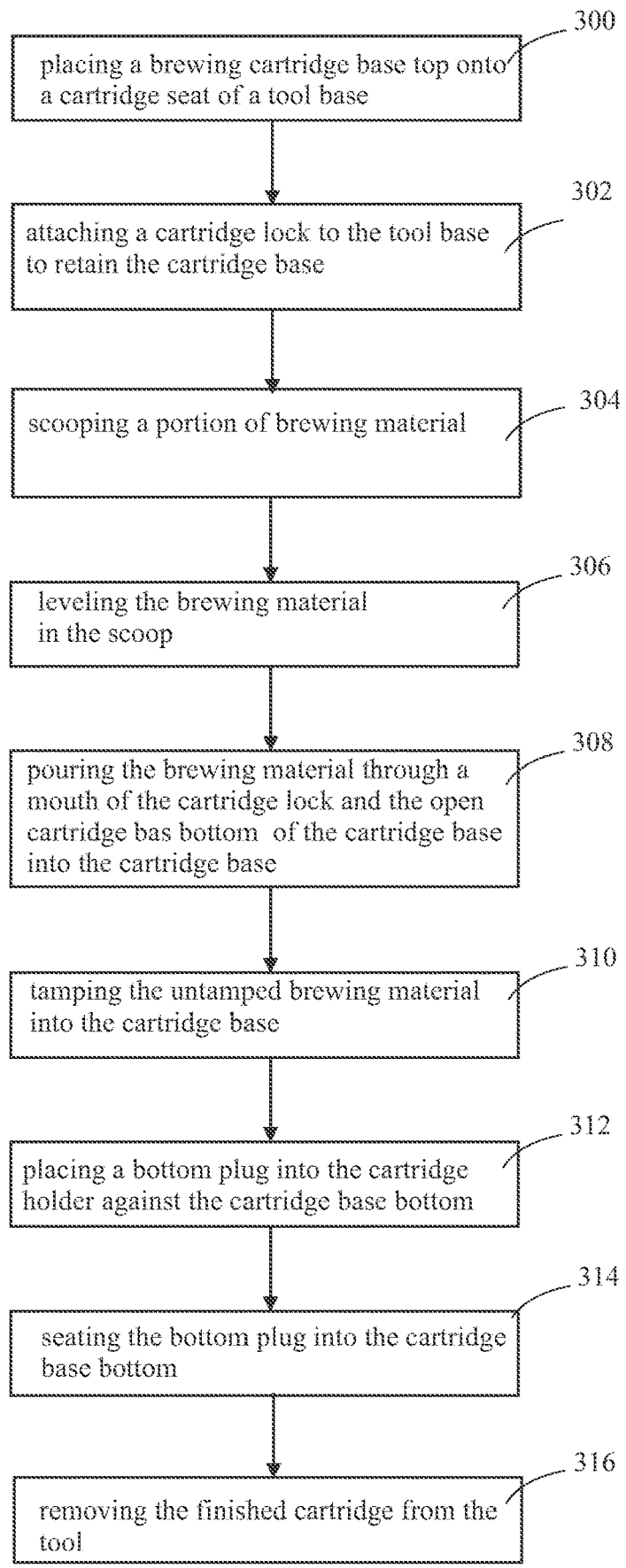
FIG. 34 shows an exemplary method of using a table-top tool according to the present invention.

FIG. 34 is a flow diagram showing an exemplary method according to the present invention of using a table-top tool. The method includes placing a frustoconical shaped brewing cartridge base onto a cartridge seat of a tool base, a closed cartridge base top against the cartridge seat, the cartridge base top having a larger diameter than an open cartridge base bottom opposite the cartridge base top 302, attaching a cartridge lock to the tool base to retain the cartridge base against the tool base 302, scooping a portion of brewing material 304, leveling the brewing material in the scoop 306, pouring the brewing material through a mouth of the cartridge lock and the open bottom end of the cartridge base, into the cartridge base 308, tamping the untamped brewing material into the cartridge base 310, placing a plug into the cartridge holder against the small end of the cartridge 312, seating the plug into the cartridge base 314, and removing the finished cartridge from the tool 316.

In general, a beverage brewing cartridge according to the invention includes a cartridge base and a plug. The cartridge base includes a sidewall and a cover. The sidewall has a first open sidewall end and a second open sidewall end, and can have any cross-sectional shape—round, polygonal, or any other shape suitable for use in a beverage brewer such as an espresso machine or the like. Further, the sidewall can have any profile, such as cylindrical, frustoconical, or any other shape. The cover is configured to be sealed or otherwise attached to a rim of the first open sidewall end, or can be already sealed or otherwise attached to the rim. The plug is configured to be inserted into or otherwise coupled to the second open sidewall end, and once coupled at least partially closes off the second open sidewall end. The beverage brewing cartridge is configured to hold beverage brewing material when the cover is sealed to the rim of the first open sidewall end and the plug is inserted into the second open sidewall end. The cover is configured to be pierced or otherwise breached to allow pressurized liquid such as water to enter the beverage brewing cartridge to brew a beverage by soaking and flowing through the beverage brewing material held therein. For example, the cover can include foil. The plug includes weakened areas configured to open after the pressurized liquid enters the beverage brewing cartridge to allow the brewed beverage to flow from the beverage brewing cartridge. For example, the weakened areas can be made of different or thinner material than that of the rest of the plug, such that the pressure of the injected liquid, the weight of the injected liquid, the heat of the injected liquid, or some combination of these factors, or other factors, causes the weakened areas to burst or otherwise open, forming outflow ports.

The plug can include a first cooperative element, the second open sidewall end can include a second cooperative element, and the first and second cooperative elements can be configured to mutually engage to removably couple the plug to the sidewall when the plug is inserted into the second open sidewall end. For example, the first cooperative element can include a peripheral recess, and the second cooperative element can include a peripheral ridge, which elements can mutually engage by snapping into place. The plug can engage with the second open sidewall end in any other known manner, such as by threaded screw engagement or friction or interference fit. The plug can also include a peripheral lip spaced from the peripheral recess, which can include gaps configured to allow the circumferential lip to collapse such as by being crushed during insertion of the plug into the second open sidewall end.

The beverage brewing cartridge can be provided fully constructed and ready for brewing. In this case the plug is arranged in the second open sidewall end, and the beverage brewing cartridge also includes beverage brewing material held within the cartridge base. For example, the beverage brewing material can be ground coffee beans or any other ground material used to brew a beverage. If an espresso beverage is desired, the coffee beans can be very finely ground.

In order to provide more flexibility in brewing a beverage, a user can fill and construct the cartridge using selected brewing material. The user can seal or otherwise attach the cover to the rim of the first open sidewall end (if it is not already sealed or otherwise attached), and can then place the cartridge base in a holder. A portion of selected beverage brewing material can then be inserted into the cartridge base through the second open sidewall end, where it can be tamped in the cartridge base through the second open sidewall end until it is compacted to the desired extent. The plug can then be inserted into or otherwise coupled to the second open sidewall end, and the cartridge is ready for use in brewing the beverage.

Different embodiments of holders and tools are described herein for use in constructing the cartridge, which can be used by a consumer to construct the cartridge at home. When placing the cartridge base in a holder, a lid of a cartridge holder of a hand-held cartridge tool can be opened, the cartridge base can be inserted into the cartridge holder of the hand-held cartridge tool, second open sidewall end first, and the lid can be closed to retain the cartridge base in the cartridge holder.

Alternatively, the cartridge base can be placed in a holder can by placing the cartridge base in a cartridge holder attached to a hand-held cartridge tool. The brewing material can be tamped in the cartridge base through the second open sidewall end by pivoting a lever about a pivot of the hand-held cartridge tool to advance a tamping plunger through a mouth of the cartridge holder. Such a tamping plunger can be attached to the lever between the pivot and a lever handle. A tamper/seater can be pivotally attached to the tool to align the tamping plunger, with the assistance of guiding elements. For example, the plug can include a guide hole and the tamping plunger can include a guide hole pin, in which case the guide hole pin can be engaged into the guide hole and the tamper/seater can be pivoted to press the plug in order to insert the plug into the second open sidewall end.

As another alternative, the cartridge base can be placed in a holder by placing the cartridge base on a cartridge seat of a tool base arranged on a surface, such that the cartridge base cover is arranged against the tool base. A cartridge lock can be attached to the tool base over the cartridge base such that the cartridge lock retains the cartridge base against the tool base. In this case, the brewing material can be tamped in the cartridge base by pushing a tamping tool through a mouth of the cartridge lock and the second open sidewall end of the cartridge base. The plug can then be inserted into the second open sidewall end by pressing the plug through the mouth of the cartridge lock and the second open sidewall end. The plug can be pressed through the mouth of the cartridge lock and the second open sidewall end, for example, by engaging a guide hole pin of a seating tool into a guide hole of the plug, and pushing the seating tool toward the cartridge lock to advance the plug through the mouth of the cartridge lock and into the second open sidewall end.

The invention has been described by way of example and in terms of preferred embodiments. However, the present invention as contemplated by the inventor is not strictly limited to the particularly disclosed embodiments. To the contrary, various modifications, as well as similar arrangements, are included within the spirit and scope of the present invention. The scope of the appended claims, therefore, should be accorded the broadest reasonable interpretation so as to encompass all such modifications and similar arrangements.

I claim:

1. A method of constructing a beverage brewing cartridge, comprising:
   providing a beverage brewing cartridge, wherein the beverage brewing cartridge includes:
      a cartridge base, including:
         a sidewall having a first open sidewall end and a second open sidewall end, and
         a cover, configured to be sealed to a rim of the first open sidewall end, wherein the cover is configured to be breached to allow pressurized liquid to enter the beverage brewing cartridge to brew a beverage, and
      a plug configured to be inserted into the second open sidewall end, wherein the plug includes weakened areas;
   sealing the cover to the rim of the first open sidewall end;
   inserting a portion of beverage brewing material into the cartridge base through the second open sidewall end; and
   inserting the plug into the second open sidewall end.

2. The method of claim 1, further comprising placing the cartridge base in a holder, prior to sealing the cover to the rim of the first open sidewall end.

3. The method of claim 1, further comprising tamping the brewing material in the cartridge base through the second open sidewall end, after inserting the portion of beverage brewing material into the cartridge base through the second open sidewall end.

4. The method of claim 1, further comprising tamping the brewing material in the cartridge base through the second open sidewall end, prior to inserting the plug into the second open sidewall end.

5. The method of claim 1, wherein the weakened areas are configured to open after the pressurized liquid enters the beverage brewing cartridge to allow the brewed beverage to flow from the beverage brewing cartridge.

6. The method of claim 1, wherein:
   the plug includes a first cooperative element, the second open sidewall end includes a second cooperative element, and the first and second cooperative elements are configured to mutually engage to removably couple the plug to the sidewall when the plug is inserted into the second open sidewall end.

7. The method of claim 6, wherein:
the first cooperative element includes a peripheral recess, and the second cooperative element includes a peripheral ridge.

8. The method of claim 7, wherein the plug includes a peripheral lip spaced from the peripheral recess, wherein the peripheral lip includes gaps configured to allow the peripheral lip to collapse during insertion of the plug into the second open sidewall end.

9. The method of claim 1, wherein the cover includes foil.

10. A method of constructing a beverage brewing cartridge, comprising:
providing a beverage brewing cartridge, wherein the beverage brewing cartridge includes:
a cartridge base, including:
a sidewall having a first open sidewall end and a second open sidewall end, and
a cover, sealed to a rim of the first open sidewall end, wherein the cover is configured to be breached to allow pressurized liquid to enter the beverage brewing cartridge to brew a beverage, and
a plug configured to be inserted into the second open sidewall end, wherein the plug includes weakened areas;
inserting a portion of beverage brewing material into the cartridge base through the second open sidewall end; and
inserting the plug into the second open sidewall end.

11. The method of claim 10, wherein the plug is arranged in the second open sidewall end, and the beverage brewing cartridge further comprises beverage brewing material held within the cartridge base.

12. The method of claim 11, wherein the beverage brewing material is ground coffee beans.

13. A method claim 10, further comprising
placing the cartridge base in a holder.

14. The method of claim 13, further comprising tamping the brewing material in the cartridge base through the second open sidewall end.

15. A method of constructing a beverage brewing cartridge, comprising:
obtaining a cartridge base, wherein the cartridge base includes:
a sidewall having a first open sidewall end and a second open sidewall end; and
a cover, attached to a rim of the first open sidewall end and configured to be breached to allow pressurized liquid to enter the beverage brewing cartridge to brew a beverage;
obtaining a plug configured to be inserted into the second open sidewall end;
placing the cartridge base in a holder;
inserting a portion of beverage brewing material into the cartridge base through the second open sidewall end;
tamping the brewing material in the cartridge base through the second open sidewall end; and
inserting the plug into the second open sidewall end;
wherein placing the cartridge base in a holder includes:
opening a lid of a cartridge holder of a hand-held cartridge tool;
inserting the cartridge base into the cartridge holder of the hand-held cartridge tool, the second open sidewall end first; and
closing the lid to retain the cartridge base in the cartridge holder.

16. A method of constructing a beverage brewing cartridge, comprising:
obtaining a cartridge base, comprising:
a sidewall having a first open sidewall end and a second open sidewall end; and
a cover, attached to a rim of the first open sidewall end and configured to be breached to allow pressurized liquid to enter the beverage brewing cartridge to brew a beverage;
obtaining a plug configured to be inserted into the second open sidewall end;
placing the cartridge base in a holder;
inserting a portion of beverage brewing material into the cartridge base through the second open sidewall end;
tamping the brewing material in the cartridge base through the second open sidewall end; and
inserting the plug into the second open sidewall end;
wherein placing the cartridge base in a holder includes placing the cartridge base in a cartridge holder attached to a hand-held cartridge tool; and
wherein tamping the brewing material in the cartridge base through the second open sidewall end includes pivoting a lever about a pivot of the hand-held cartridge tool to advance a tamping plunger through a mouth of the cartridge holder, wherein the tamping plunger is attached to the lever between the pivot and a lever handle.

17. The method of claim 16, wherein a tamper/seater is pivotally attached to the tool to align the tamping plunger.

18. The method of claim 17, wherein the plug includes a guide hole and the tamping plunger includes a guide hole pin, the method further comprising:
engaging the guide hole pin into the guide hole; and
pivoting the tamper/seater to press the plug, thereby inserting the plug into the second open sidewall end.

19. A method of constructing a beverage brewing cartridge, comprising:
obtaining a cartridge base, comprising:
a sidewall having a first open sidewall end and a second open sidewall end; and
a cover, attached to a rim of the first open sidewall end and configured to be breached to allow pressurized liquid to enter the beverage brewing cartridge to brew a beverage;
obtaining a plug configured to be inserted into the second open sidewall end;
placing the cartridge base in a holder;
inserting a portion of beverage brewing material into the cartridge base through the second open sidewall end;
tamping the brewing material in the cartridge base through the second open sidewall end; and
inserting the plug into the second open sidewall end;
wherein placing the cartridge base in a holder includes:
placing the cartridge base on a cartridge seat of a tool base arranged on a surface, such that the cartridge base cover is arranged against the tool base; and
attaching a cartridge lock to the tool base over the cartridge base such that the cartridge lock retains the cartridge base against the tool base.

20. The method of claim 19, wherein tamping the brewing material in the cartridge base includes pushing a tamping tool through a mouth of the cartridge lock and the second open sidewall end of the cartridge base.

21. The method of claim 20, wherein inserting the plug into the second open sidewall end includes pressing the plug through the mouth of the cartridge lock and the second open sidewall end.

22. The method of claim 21, wherein pressing the plug through the mouth of the cartridge lock and the second open sidewall end includes:
   engaging a guide hole pin of a seating tool into a guide hole of the plug; and
   pushing the seating tool toward the cartridge lock to advance the plug through the mouth of the cartridge lock and into the second open sidewall end.

* * * * *